United States Patent [19]

Richardson, Jr.

[11] Patent Number: 4,777,327
[45] Date of Patent: Oct. 11, 1988

[54] ANTI-GALLOPING DEVICE, TRANSMISSION LINE COMBINED THEREWITH, AND METHODS

[76] Inventor: Albert S. Richardson, Jr., 3 Wingate Rd., Lexington, Mass. 02173

[21] Appl. No.: 9,231

[22] Filed: Jan. 30, 1987

[51] Int. Cl.[4] .............................................. H02G 7/14
[52] U.S. Cl. ..................................................... 174/42
[58] Field of Search ........................... 174/42; 188/378

[56] References Cited

U.S. PATENT DOCUMENTS

| | | | |
|---|---|---|---|
| 2,215,541 | 9/1940 | Buchanan et al. | 174/42 |
| 2,219,893 | 10/1940 | Goss | 174/42 |
| 2,271,935 | 2/1942 | Buchanan et al. | 174/42 |
| 2,694,101 | 11/1954 | Shuhart | 174/42 |
| 3,904,811 | 9/1975 | Otsuki et al. | 174/42 |
| 3,916,083 | 10/1975 | Yakovlev et al. | 174/42 |

*Primary Examiner*—Laramie E. Askin
*Attorney, Agent, or Firm*—Hamilton, Brook, Smith & Reynolds

[57] ABSTRACT

A weight is installed in a vertical plane above a subject line. Gravity pulls the weight to an initial angle of about 140 degrees from the starting plane and thereby twists the line. The twist angle remains fixed so long as no gallop occurs. During galloping motion of the line, the initial twist is decreased as the line approaches the peak of motion and reinduced as the line leaves the peak. The line correspondingly rotates between zero degrees added twist and beyond about 140 degrees, the initial added twist angle. The rotation of the line continuously changes the profile of the air foil of the line formed by ice frozen about the line, and thereby dampens air lift and galloping of the line. The weight is attached to the line by a grip and a pair of brackets secured to the grip at one end and fitted through a slot in the weight at opposite ends. A bolt tightens the grip between the bracket members at the one end, such that the brackets and the grip pivot about the line and the opposite ends of the brackets exert an outward force within the slot of the weight to firmly retain the weight. Alternatively, the bolt is placed between the grip and the weight such that the brackets loosely retain the weight to prevent vibration of the line. Another clamp and grip enable adjustment of the location of the center of gravity of the weight with respect to the line.

50 Claims, 4 Drawing Sheets

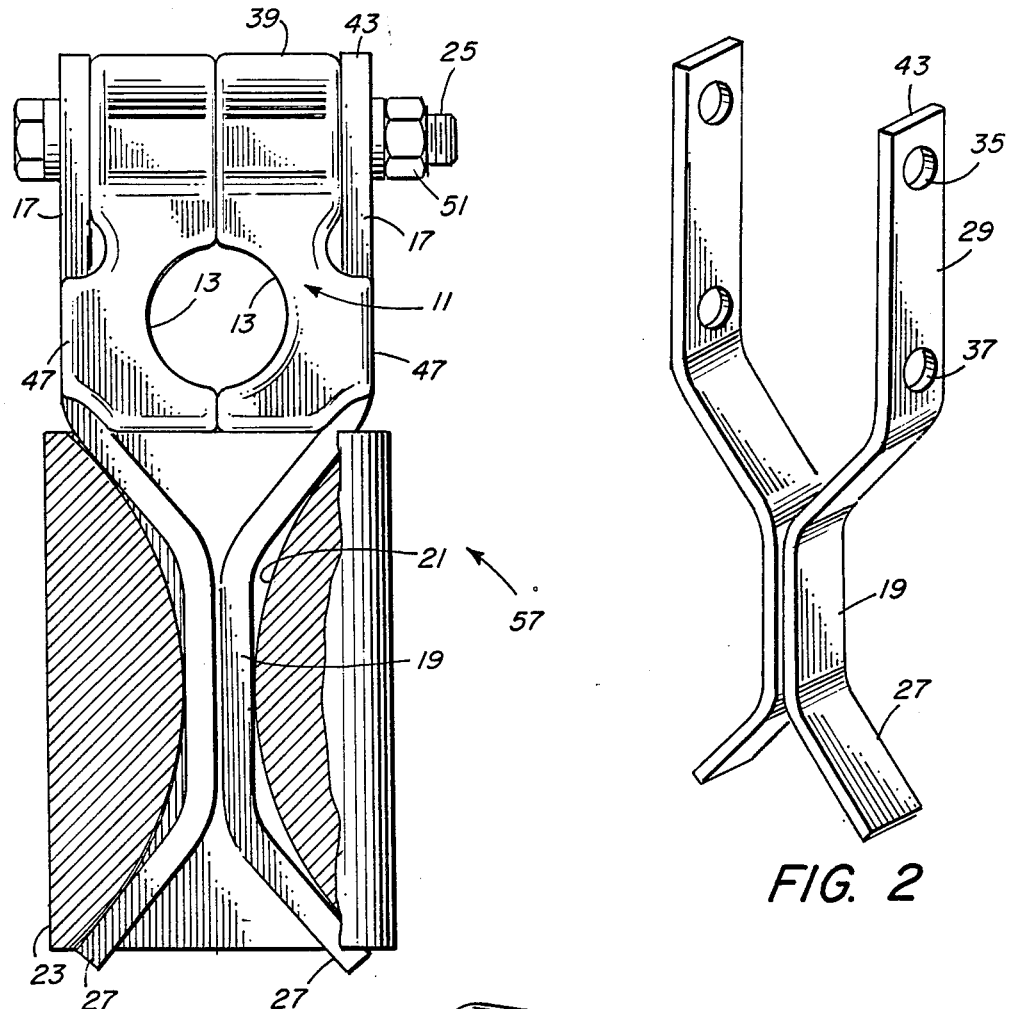
FIG. 1a
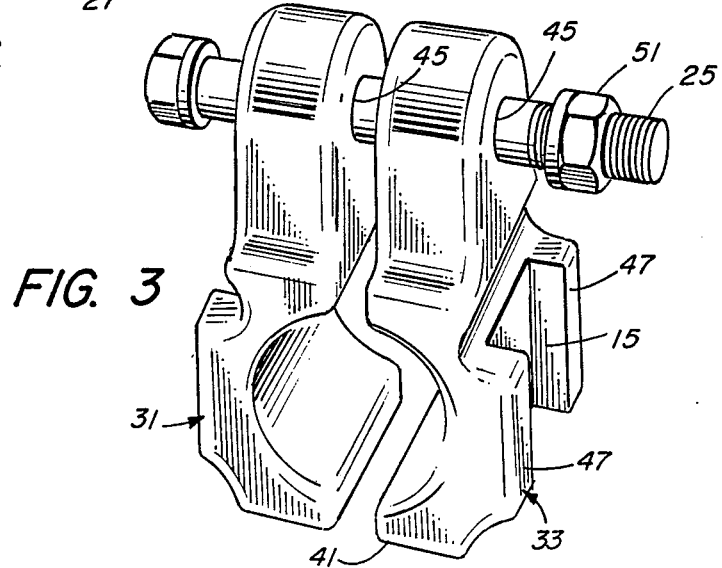
FIG. 2
FIG. 3

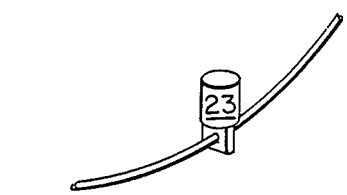
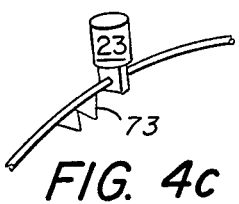
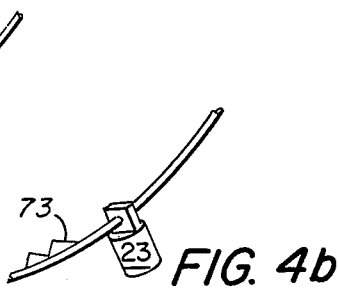
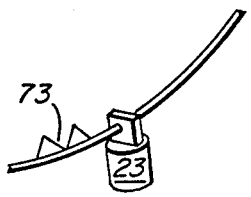
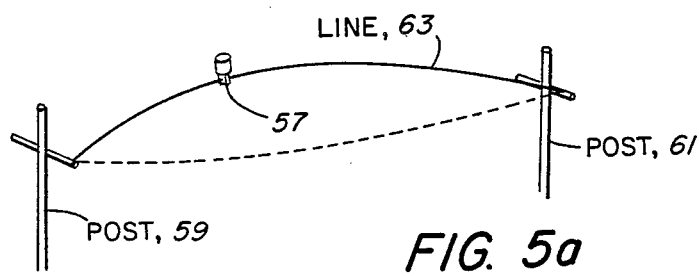
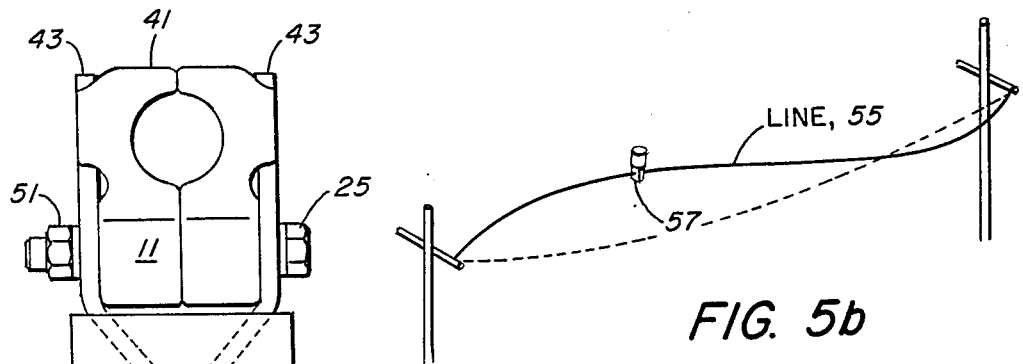
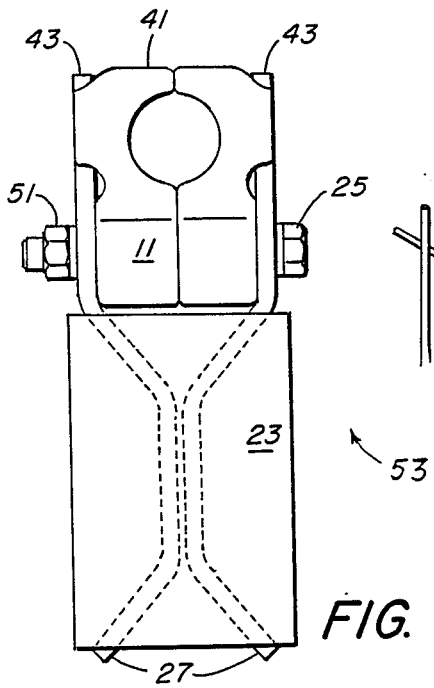

ANTI-GALLOPING DEVICE, TRANSMISSION LINE COMBINED THEREWITH, AND METHODS

BACKGROUND OF THE INVENTION

Under the forces of wind, electrical transmission lines such as telephone cables, power lines and the like can bounce in a vertical fashion known as "galloping". The galloping poses a threat to the support of the line, and the line may become tangled with neighboring lines. There are three primary categories of galloping motion in long span catenary cables, wires and conductors. The first is exhibited by a round cable that is supported by towers spaced apart at intervals of several hundred feet. Under certain weather conditions, ice tends to form along the length of the cable into the direction of the wind. As a result, the ice forms a wing protruding out of the cable. When the wind catches the aerodynamic shape of the iced cable, a vertical lift is generated and results in galloping. Hence, there is galloping due to wind force acting on the aerodynamics of an iced cable.

The second category of galloping is exhibited by out-of-round shaped lines which when twisted by wind have an aerodynamic profile without any added ice formation. One such line is a telephone cable which has a uniform figure eight cross section. When the wind blows, the figure eight shape is turned to one side and forms in effect a wing enabling air lift which results in galloping.

The third category is exhibited by steeply angled cables that cut into the wind. The vertical lift that results in galloping is due to the angle that is formed between the wind and the cable. One example of such a cable is a guy wire.

In all three cases the cable is subject to gallop or vertical dancing motion of large amplitude if the wind force and its angle with the aerodynamics of the cable are related in a way that overcomes the inherent friction of the cable and its supports. In order to counteract a tendency toward galloping once the conditions of wind force and complementary angle are present, the damping or friction of the cable must be increased or the aerodynamics of the cable must be changed.

Most methods for increasing the damping in a transmission line or cable apply the long recognized principle that a twisted shape will not gallop. In the case of ice formed about a cable the fundamental idea behind twisting the cable so as to increase aerodynamic damping is "to confuse the ice shape" as it is distributed in a span which would otherwise gallop if the ice shape were uniform. Only a few degrees of twist may be required to prevent galloping of the span. This principle has been successfully applied in twisted telephone cables to form a figure eight shape in its cross section which continually varies along the span and thus breaks uniformity in the ice formation along the length of the cable. More recently, the same process of twisting two conductors upon each other forming a varying figure eight cross section has been applied to overhead power conductors such as in the twisted T-2 Conductor by the Kaiser Aluminum & Chemical Company in the U.S.

The same methodology is employed in the add-on unit of Preformed Line Produts, Inc., called "The Spoiler". The add-on unit is wrapped around the conductor over 30% of the span and thereby adds discontinuity to the ice formation along the conductor span.

Another method for increasing damping is the addition of a "drag damper" over 30% of the length of the span. The "drag damper" is in the shape of a small flat plate which enhances the drag force and thereby reduces the angle at which the wind acts upon an iced cable. In another type of drag damper called the "Windamper" (a registered trademark of Albert Richardson) the devide is attached to a single point in the conductor span below the conductor. The device blows with the wind and twists the conductor itself to create a non-uniform distribution of ice shape along the span.

In the case of TV antenna guy cables, there is another method that has come into widespread use. Again, based on the fundamental principle of increased damping or friction, a device called the "Sandamper" (a registered trademark of Albert Richardson) prevents galloping of TV guy cables by a ball half filled with sand rolling on top of a portion of the cable, counteracting the vertical lift of the cable.

SUMMARY OF THE INVENTION

In the present invention, twisting of the span occurs dynamically. An initial component of twist in the span is established by gravity. A weight is initially installed "upside down" in a vertical plane above the transmission line or cable. The force of gravity pulls the weight against the predetermined torsion stiffness of the line to an initial angle of about 140° from the starting plane and thereby induces a component of twist in the line. This "cocks the system". The twist angle remains fixed so long as no gallop occurs.

When gallop motion occurs as a result of ice formation along the span and a complementary wind, the vertical acceleration of the gallop motion will at first cause the weight to complement the initial component of twist. As the line approaches the peak of gallop motion, a cancellation of the twist occurs, and a reinduction of the twist occurs thereafter. The weight rotates the line between about 180 degrees and about zero degrees of added twist. The ice shape is correspondingly twisted along the span of the line in two opposite directions causing a change in air foil profile which dampens the effect of the wind acting on the twisted line. The ice shape twists between faces of opposite sides of its profile and hence provides greater dampening than in prior art devices.

In a preferred embodiment, the weight is attached to the line by a grip and a clamp means. The grip is engageable with the circumference of the line and has an axis along the line. The clamp locates the center of gravity of the weight at a point spaced from the axis such that gravity pulls the weight downward to induce a component of twist in the line. The clamp comprises a pair of bracket members fitted to opposite sides of the grip at one end and fitted through a slot through the center of the weight at an opposite end. The opposite ends of the bracket member are outwardly angled to form a combined width which is larger than the width of the slot. The individual width of each opposite end, however, is smaller than the width of the slot for ease of assembly. A bolt pulls the bracket members against the grip to tighten the latter about the line. The same bolt holds the bracket members together and their combined shape retains the bracket members within the slot of the weight to support the weight. Further, where the bolt is connected to the end of the clamp away from the weight, the bracket members and the grip pivot about the line during tightening of the bolt such that the opposite ends of the bracket members exert an outward force within the slot means of the weight and thereby firmly retain the weight. Slots in the opposite sides of the clamping means guide the bracket members from the bolt to the slot of the weight means and prevent rotation of the brackets about the bolt.

It is preferred that the weight be connected to and twist the line at about a one third point in the span of the line.

Another weight and grip are mounted together by a bolt which enables the weight to pivot toward and and away from the line to adjust the location of the weight's center of gravity with respect to the line. With such an adjustment an added twist to the line between about 90 degrees and about 160 degrees can be easily obtained at various positions in the span of the line.

In addition to damping galloping of transmission lines, the weight assembly of the present invention may be used to dampen vibration and other vertical movement in guy cables and overhead lines in general. In one such application the weight is allowed to rattle on the brackets. To that end the bolt is positioned between the grip and the weightsuch that the opposite ends of the bracket members pivot toward each other and loosely retain the weight. The ends of the slot through the weight are curved to fit that portion of the brackets which make contact with the weight during rattling. The loosely retained weight responds in opposition to movement of the guy line which is axial or transverse to the weight. This assembly of the apparatus is attached to the guy line in pairs at about 6 to about 25 feet away from each end of the span with about one foot between pair members. Each pair is attached above the line with members of respective pairs to opposite sides of the line such that a "V" shape of about 90 degrees is formed by each pair.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

FIG. 1a is a front view, partially cut away, of apparatus embodying the present invention.

FIGS. 1b-1c are front views of alternative weights used in the apparatus of FIG. 1a.

FIG. 2 is a perspective view of the bracket members of the embodiment of FIG. 1a.

FIG. 3 is a perspective view of the gripping means of the apparatus of FIG. 1a.

FIGS. 4a-4d are schematic illustrations of the use of the apparatus of FIG. 1a.

FIG. 5a is an illustration of single loop gallop motion in a line.

FIG. 5b is an illustration of double loop gallop motion in a line.

FIG. 6 is a front view of an alternative assembly of the apparatus of FIG. 1a.

DETAILED DESCRIPTION OF THE PREFERRED EMBODIMENT

Figure 1B:
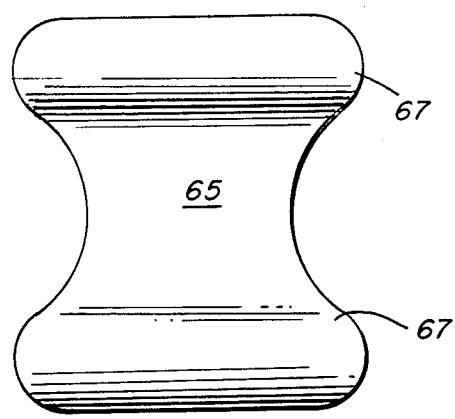

Apparatus for inducing a component of twist in a conductor, or other line, is shown in FIGS. 1a, 2 and 3. Two symmetrical halves 31 and 33 of grip 11 engage a line by cooperating half cylinder grooves 13. Slots 15 on opposite outer sides of the grip 11 hold bracket members 17 at one end. Central regions 19 and opposite ends 27 of the bracket members 17 fit into slot 21 of a weight 23. A single bolt 25, secured on one side by nut 51, pulls the bracket members 17 against the grip 11 to tighten the latter about the line. Bolt 25 also holds the bracket members 17 together and their combined shape retains the bracket members 17 within slot 21 to support the weight 23. The tightening of bolt 25 to the end of the grip 11 and the one end of bracket members 17 away from the weight 23 causes the bracket members 17 and the grip 11 to pivot about the line such that opposite ends 27 of bracket members 17 exert an outward force within weight slot 21 and thereby firmly retain the weight 23. The single bolt 25 of the assembly thus serves to tighten the grip 11 about the subject line and hold the bracket members 17 together within the weight slot 21 to support the weight 23.

Alternatively, as shown in FIG. 6 the bolt 25 may tighten the bracket members 17 against the grip 11 between the grip 11 and the weight 23 such that the opposite ends 27 of bracket members 17 pivot toward each other and loosely retain weight 23. This assembly allows the weight 23 to rattle about bracket members 17 and has application to other lines as discussed later.

In the preferred embodiment, weight 23 is a cylindrical aluminum weight weighting about 8 lbs and having a diameter of about 5 inches. Slot 21 is centrally located along an axis of the weight 23 and runs the length of weight 23. Both end regions of slot 21 are rectangular in cross section with dimensions of about 1.5 inches by about 4.25 inches. A central region of slot 21 has inwardly arcing walls forming a narrow, funnel-like passage between the two end regions.

Figure 1C:
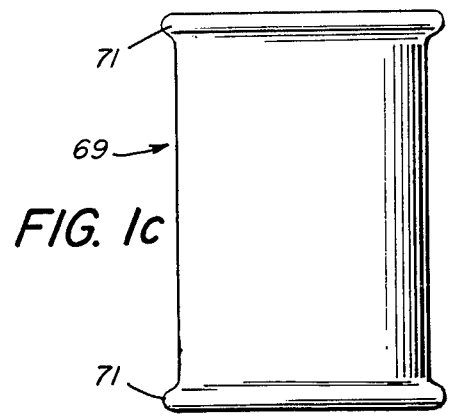

Alternatively, other shaped weights may be used as shown in FIGS. 1b and 1c. To limit the generation of corona on sharp corners of the weight in extra high voltage applications, a weight 65 which is hour glass shaped with smooth, curved edges 67 about the upper and lower surfaces is suitable.

In power line applications of the present invention, a generally cylindrical weight 69 with smooth exterior edges 71 about the circumferences of the upper and lower surfaces of the weight is suitable. In this case, the weight is about 10 lbs due to the lines being relatively thick in diameter (about 2 inches).

Bracket members 17 as shown in FIG. 2 are two individual aluminum pieces. Each bracket member is about 1.5 inches wide, about 0.25 inch thick and about 12.5 inches in length. End regions 29 of bracket members 17 have an axia parallel to the axis of weight 23 and fit flat against opposite outer sides of halves 31 and 33 of grip 11 through slots 15 for a length of about 5 inches. End regions 29 then angle toward each other at an angle of about 38° from the axis of weight 23 and encompass an end portion of grip 11. Holes 35 and 37 for bolt 25 are located about 1 inch and 3.5 inches respectively from outer tips 43 of end regions 29.

Central regions 19 of bracket members 17 generally lie along the longitudinal axis of weight 23 and fit along the curved walls of slot 21 of the weight 23.

Opposite ends 27 of bracket members 17 angle away from each other and outward from slot 21 of weight 23 at an angle of about 38° from the axis of the weight. Opposite ends 27 extend out of slot 21 and away from each other to form a combined width of about 4.5 inches which is greater than the width of slot 21. In turn, this enables bracket members 17 to retain weight means 23. The individual dimensions of the bracket members 17, however, enable one bracket member 17 at a time to be inserted through slot 21 and hence make for easy assembly of apparatus 57.

Further, where the bolt 25 is connected to bracket members 17 and grip 11 through holes 35 of the bracket members 17, the bracket members 17 and grip 11 pivot about the line and cause opposite ends 27 and central region 19 of bracket members 17 to exert an outward force against the wall of slot 21 within weight 23 and thereby firmly retain weight 23.

Grip 11 as shown in FIGS. 1a and 3 comprises two symmetrical halves 31 and 33 which work in cooperation with each other to engage a transmission line, cable or the like. Half cylinder grooves 13 of each half 31 and 33 are shaped to jointly encompass a line having a diameter between about 1½ inches to about 2½ inches.

Other grips similar to grip 11 with smaller half cylinder grooves to encompass a line as small as ¼ inch in diameter are also suitable.

Bolt 25 fits through grip 11 by hole 45 which runs between opposite outer sides of halves 33 and 31. In the illustrated embodiment, slots 15 on opposite sides of halves 33 and 31 are formed by edges 47 of the outer sides of halves 33 and 31. Slots 15 guide the bracket members 17 from the bolt 25 to the weight 23 and prevent rotation of the bracket members 17 about bolt 25.

Although the parts of the illustrated apparatus comprise aluminum, other metals and alloys may be used.

In the field of art concerning power lines, aluminum is widely accepted because it is conductive and nonmagnetic. In turn, the apparatus 57 comprising aluminum reduces the field strength around it because it is nonmagnetic. Further, aluminum allows the apparatus to be relatively light weight, about 8 pounds, such that the subject line experiences no added sag when the apparatus is attached to the line. This is a concern due to the theory that an increase in the gallop amplitude is related to sag by Newton's law of gravity, by the equation $$(2\pi F)^2 A = G = 32.2 \text{ ft/sec}^2$$

where A is gallop amplitude when acceleration is one G and F is gallop frequency equal to $$\frac{1}{\sqrt{\text{sag}}}.$$

Solving for A using a one G gallop gives:

$$\left(2\pi \frac{1}{\sqrt{\text{sag}}}\right)^2 A = 32.2$$

$$A = \frac{32.2}{4\pi^2} \text{ sag}$$

$$= 0.815 \text{ sag},$$

or a gallop peak amplitude at about 80 percent of the sag. For a two loop gallop, $$F = \frac{2}{\sqrt{\text{sag}}}$$

and hence gallop peak amplitude A=0.201 sag or about 20 percent of the sag during a one G gallop. Thus, by minimizing the sag, one minimizes the peak amplitude, A.

As shown in FIG. 4a the apparatus 57 is initially installed in an upside down fashion with the weight 23 placed in a vertical plane above the line. The grip 11 is then secured to the line such that gravity pulls the weight 23 through a moment arm to one side of the line to an angle of greater than about 140° from the initial vertical plane as shown in FIG. 4b. The weight 23 having been pulled to that one side induces a component of twist in the line which component is greater than about 140°.

This induced component of twist remains and the line hangs at its original sag level until the line begins to gallop. When galloping begins, the component of twist is initially increased with upward movememt and initial increase in velocity of the line. As the line moves upward the component of twist is gradually released. This is due to the upward force of the acceleration of the weight 23 cancelling the downward pull of gravity which induced the twist. As the line moves upward, the downward force of gravity is increasingly cancelled as is the induced twist with an increasing upward force of acceleration. At the peak of gallop motion the upward force of acceleration reaches a maximum, and hence a minimum (zero) gravity level, and causes the velocity of the line to reach a zero point. At this point the component of twist is totally released as shown in FIG. 4c. The weight 23 then begins to fall causing the line to move downward with increasing velocity due to the increasing downward pull of gravity. In turn, the component of twist is gradually reinduced. During the downswing, the line experiences the opposite of that during the upswing. That is, the downward force of gravity increases and the upward acceleration force decreases to zero at the original sag level of the line where the twist is fully reinduced. The velocity is at a maximum at the original sag level and pulls the line just below the original sag level where the forces of gravity cause the weight to have its greatest downward effect on the line. The component of twist at that point reaches about 180 degrees as shown in FIG. 4d. The line then slows down to a zero velocity point at a position just below the original sag level. At this point the line begins its upward untwisting motion all over again and continues in this harmonic motion pattern rotating between about 0 degrees and 180 degrees added twist.

As a result of this rotation, a continuous corresponding pattern of change occurs in the profile of the line and of any air foil formed by ice frozen about the line. The profile of the line or of any ice 73 frozen about the line after the line has been initially twisted is about 270 degrees in the direction of the twist with respect to the vertical plane of the twisted line as shown in FIG. 4b. During the upward movement of the line when the line rotates between its initial added twist angle of about 140 degrees to a zero degree added twist angle at the peak of gallop motion, the associated profile rotates 140 degrees from about 270 degrees back to about 130 degrees. This places the ice 73 on the other side of the vertical plane of movement as illustrated in FIG. 4c. During downward movement of the line, the component of twist is reinduced in the line and the profile correspondingly tends to its original position of about 270 degrees. Upon reaching the maximum level below the original sag level at the end of the downswing, the line reaches a twist of about 180 degrees and the profile likewise reaches an angle of up to about 310 degrees as shown in FIG. 4d. Thus, the change in profile is between two opposite faces of the profile which causes the associated air foil to lose air lift and thereby dampens galloping of the line.

In view of these effects on the associated profile of the rotating line, a large initial twist angle maximizes the dampening. On the other hand the closer to 180 degrees added twist, the less effect apparatus 57 has due to the gravitational forces at the maximum downswing leel. Further, 90 degrees is the least amount of twist through which a change in face of the profile and therefore damping will occur. Thus, a twist angle between about 90 degrees and about 160 degrees is suitable.

The apparatus of FIG. 1 is positioned about at a one-third point in the span of the line to have maximal effect on both single loop and double loop gallop motion. What is meant by a single loop gallop is shown in FIG. 5a where the galloping line 63 crosses the horizontal line between the posts 59 and 61 only at the ends of the span. In a double loop gallop as shown in FIG. 5b, the line 55 crosses the horizontal in three points, at both ends of the span and midway between ends of the span. The broken line in FIGS. 5a and 5b represents the horizontal line between the support posts and also illustrates an original sag level.

Typically, a halfway point is employed in damping methods of prior art. However, in a double loop gallop, a device at the halfway point would have minimal effect on the line 55 as can be seen in FIG. 5b. On the other hand placement at about ¼ the span would maximize the effect of the device in the double loop gallop case but would decrease effectiveness for the single loop case where effectiveness is decreased the farther away from the midpoint the device is place in that case. Because a subject line can experience either a single or double loop gallop depending on the wind and line conditions, optimum placement is between the half way point optimum for single loop gallop and the ¼ point optimum for the double loop gallop. Hence, applicant places the apparatus 57 embodying the present invention at about a ⅓ point in the span as shown in both FIGS. 5a and 5b.

The apparatus 57 of FIG. 1a may be used to dampen other movement of a line. This is accomplished in one of two ways. First, the apparatus 57 may be clamped below the line without inducing a component of twist. In such a position, the weight 23 acts as a counter balance to the vertically moving line. In the case of most cables and power lines, apparatus 57 may be attached near two post ends of the line to dampen vibration and prevent reverberation. Further, following the methodology of the placement for a galloping line, the apparatus may be attached at about the ⅓ point in the span to dampen vertical movement in general. In the case of telephone cables and the like which have a nontwisted, nonvarying figure eight cross section, an aerodynamic twisting of about 80 degrees occurs with high wind speeds. Such twisting occurs on span lengths greater than about 200 feet at wind speeds greater than about 30 m.p.h. The twisting causes a change in the profile of the figure-eight cable to a more aerodynamic position in which the cable experiences air lift and vertical movement. Apparatus 57 is attached toward the middle of the span to prevent the initial twisting which enables the airlift and the vertical movement of the line when apparatus 57 is not attached to the line. Although weight 23 is, as previously mentioned, considered to be relatively light weight, in this application of apparatus 57, weight means 23 is heavy enough to counter balance the twisting of the line by high speed winds.

The second method for countering vertical movement involves attaching the grip 11 to the line such that the bolt 25 is between the grip 11 and the weight 23. As shown in FIG. 6 grip 11 may be reversed such that surface 41 of grip 11 is positioned between tips 43 of bracket members 17. Bolt 25 is then fed through holes 37 of the bracket members 17 such that bracket members 17 pivot toward each other about the clamped line and opposite ends 27 loosely retain weight 23. The combined width of the ends 27 is still greater than that of the weight slot 21 but the bracket members 17 no longer press outward against the walls of this slot. Hence, the loosely retained weight is able to rattle about the bracket members 17.

The loosely retained weight is attached above the subject line at about a 45 degree angle with respect to the vertical plane in which the line moves. The apparatus 53 of FIG. 6 is attached to the subject line about 6 feet to about 25 feet away from a guy pin, socket bowl, or the like at the end of the span. A second assembly of apparatus 53 is attached to the line about one foot farther away from the end of the span than the first assembly and at an angle to the other side of the line of about 45 degrees with the vertical plane such that the two assemblies form a "V" shape above the line. Another pair of the apparatus is similarly attached to the other end of the span. Vibration is absorbed by the loosely held weights being able to move in opposition to movement of the line along the axis of the weight. Further, the "V" formation of the pairs of the apparatus enable the loosely held weights to dampen a wider range of movement of the line. The end placement of the two pairs of apparatus dampens reverberation through the line. This method is suitable for, but not limited to, TV tower guy wires and power conductors.

Figure 7:
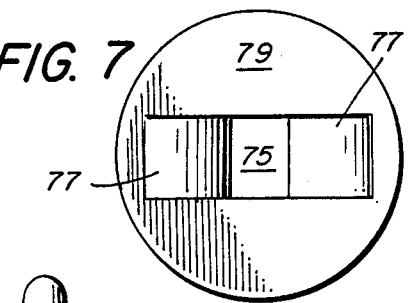
FIG. 7 is an end view of a weight of the present invention.

Shown in FIG. 7 is an end view of another design of the weight for antivibration applications. The edges 77 at the ends of the slot 75 in weight 79 are curved and smooth to enable more gentle association with the portions of the bracket members 17 which make contact with the weight 79. The curved edges enable less wear on these portions of the bracket members in comparison to sharp edges of a weight slot abutting the bracket members.

Figure 8A:
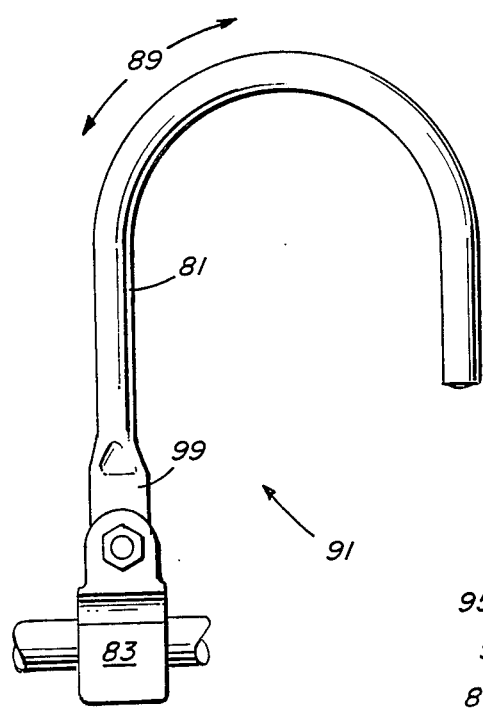
FIGS. 8a and 8b are a side view and front view respectively of another embodiment of the present invention with a reversible grip.
Figure 8B:
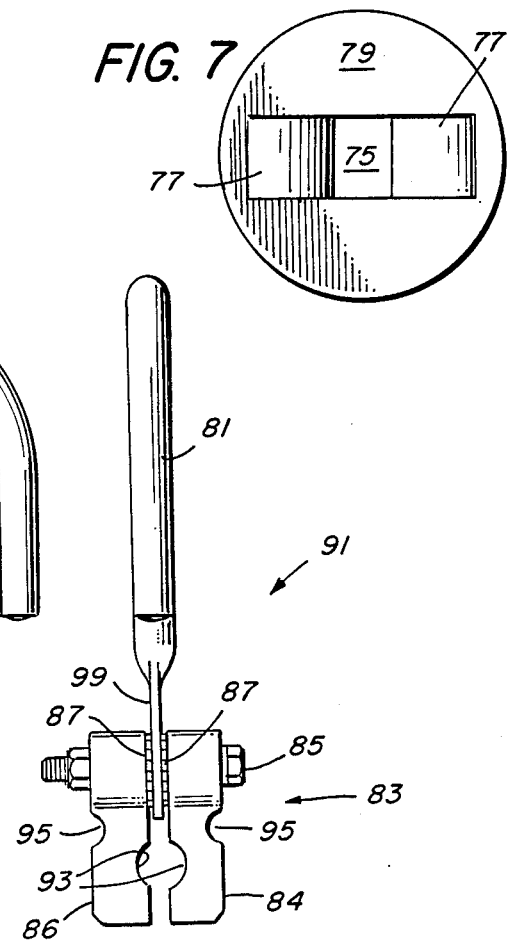

In another embodiment of the invention shown in FIGS. 8a and 8b, the location of the center of gravity of the weight 81 is adjustable. The horseshoe-shaped weight 81 is mounted to a grip 83 which is a variation of the grip 11 in the embodiment of FIG. 1a. Half cylinder grooves 93 at one end of grip 83 engage a line having a diameter of about 1 inch. Bolt 85 holds an opposite end of grip 83 to one end of weight 81 and tightens grip 83 about the line. Before bolt 85 is tightened, weight 81 pivots about the bolt 85 moving the center of gravity of the weight further away from or closer to an axis of the grip 83 which lies along the line. The different space locations of the center of gravity of weight 81 with respect to the line produce different moment arms through which gravity pulls the weight to one side of the line to induce an added twist in the line. The location of the center of gravity of weight 81 with respect to the line is at a maximum moment arm in FIG. 8a. Pivoting the weight toward the line in the direction of either arrow 89 decreases the moment arm and hence decreases the torque with which the weight will induce a twist angle in the line. This feature enables a wider range of placement of the apparatus 91 along the span of a line as different positions in the span require different moment arms of the weight to induce a component of twist.

Apparatus 91 is initially installed upside down above the line with a chosen moment arm or position of the center of gravity of weight 81 with respect to the line. Bolt 85 is tightened and the weight is allowed to fall to one side of the line to induce an initial twist angle. If the induced twist angle is not suitable, bolt 85 is loosened and weight 81 is pivoted about bolt 85 to a moment arm position which will produce a suitable twist angle. The apparatus 91 is place upside down above the line, bolt 85 is tightened and weight 81 is allowed to fall to one side of the line to the suitable twist angle.

Star washers 87, between the grip 83 and each side of the one end 99 of weight 81 along the bolt 85, prevent the weight 81 from slipping once the bolt 85 is tightened.

Figure 9:
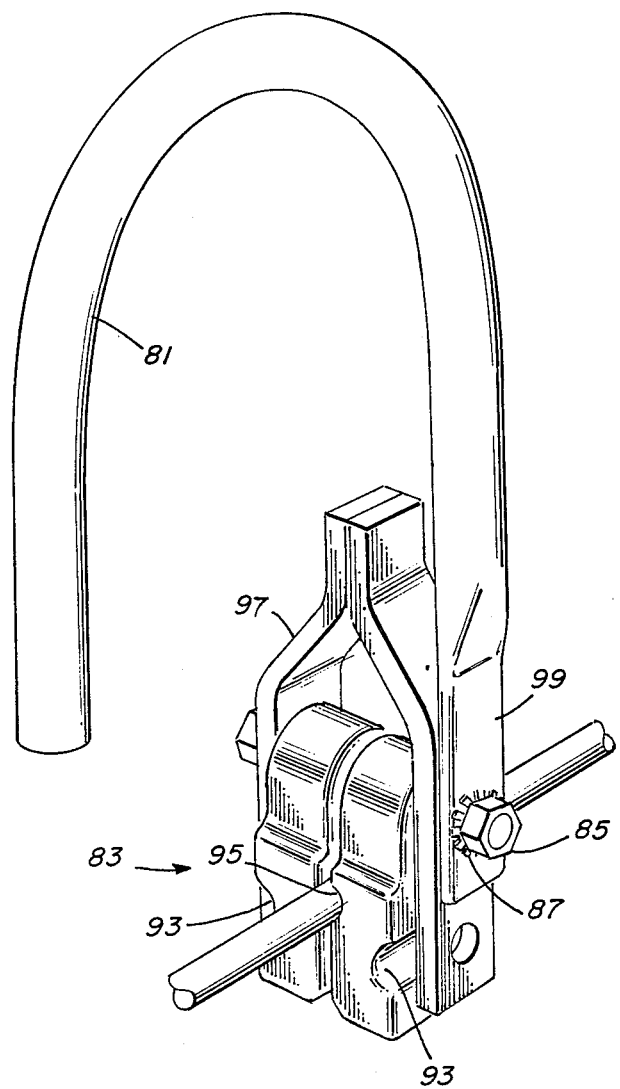
FIG. 9 is a perspective view of the embodiment of FIGS. 8a and 8b with the grip reversely assembled.

For smaller diameter lines, about ¼ inch in diameter, the two halves of grip 83 may be reversed such that sides 84 and 86 are juxtaposed and half cylinder grooves 95 engage the line. Half cyclinder grooves 95 form a smaller combined diameter than half cylinder grooves 93. As shown in FIG. 9, brackets 97 are positioned on opposite sides of the reversed grip 83, and the one end 99 of weight 81 is mounted on a side of one bracket opposite the grip 83. The tightening of bolt 85 pulls the brackets 97 together about the grip 83 and thereby aids in the tightening of grip 83 about the line. Brackets 97 also position the one end 99 of weight 81 away from the line so that weight 81 is able to freely pivot about bolt 85 without becoming tangled in the line. Brackets 97 are the same brackets 17 of the embodiment of FIG. 1a cut at about half the length of the central region 19. Star washer 87 positioned between weight 81 and the one side of bracket 97 opposite grip 83 prevents weight 81 from slipping once bolt 85 tightens the parts together about the line.

Weight 81 is an aluminum tubing bent to a horseshoe shape with the one end 99 flattened for drilling the hole through which bolt 85 fits. The tubing is filled with lead through the end opposite the flattened end 99. Installation and pivoting adjustment of the weight 81 is the same with the brackets 97 as without brackets 97.

Apparatus 91 dampens galloping by the same scheme of rotating the line as apparatus 57 of FIG. 1a and has the same general applications.

While this invention has been particularly shown and described with references to preferred embodiments thereof, it will be understood by those skilled in the art that various changes in form and details may be made therein without departing from the spirit and scope of the invention as defined by the appended claims.

I claim:

1. A transmission line having apparatus for damping galloping comprising:
   gripping means, having an axis along the transmission line, engaged with a circumference of the transmission line; and
   weight means mounted to the gripping means with its center of gravity at a point spaced from the axis of the gripping means and mounted such that the transmission line is twisted by the downward force imposed by the weight means, the transmission line being substantially twisted in a manner which enables during galloping of the transmission line a continuous pattern of change in profile of an air foil formed by the transmission line to dampen the transmission line,
   the induced component of twist to the transmission line being greater than about 90 degrees with respect to the vertical plane above the line in which the line moves.

2. A transmission line as claimed in claim 1 wherein the weight means is mounted to the gripping means by clamping means comprising:
   a pair of bracket members fitting adjacent to opposite sides of the gripping means and extending into a slot through the center of the weight means; and
   means to hold the gripping means and the bracket members together at one end of each of the bracket members, opposite ends of the bracket members being outwardly angled such that a combined width of the opposite ends is greater than the width of the slot, but individual widths of the opposite ends of each bracket member being smaller than the width of the slot, the opposite ends of the bracket members supporting the weight means.

3. A transmission line as claimed in claim 2 wherein the means to hold the gripping means and the bracket members together includes a bolt at the one end of each of the bracket members which causes the bracket members and the gripping means to pivot about the transmission line such that the opposite ends of the bracket members exert an outward force within the slot of the weight means and thereby firmly retain the weight means.

4. A transmission line as claimed in claim 3 wherein the bracket members are shaped having central regions which are juxtaposed within the slot of the weight means, end regions of the one end which are spread apart about the gripping means and lie parallel to the central regions, the end regions connected to one end of the central regions by inwardly angled pieces, and the outwardly angled opposite ends connected to opposite ends of the central regions.

5. A transmission line as claimed in claim 2 wherein said holding means is a bolt positioned between said gripping means and weight means such that the opposite ends of the bracket members loosely retain the weight means.

6. A transmission line as claimed in claim 5 wherein the bracket members are shaped having central regions which are juxtaposed within the slot of the weight means, end regions of the one end which are spread apart about the gripping means and lie parallel to the central regions, the end regions connected to one end of the central regions by inwardly angled pieces, and the outwardly angled opposite ends connected to opposite ends of the central regions, the loosely retained weight means rattling about the inwardly angled pieces and the outwardly angled opposite ends.

7. A transmission line as claimed in claim 5 wherein the ends of the slot through the center of the weight means have edges which are curved to associate with the bracket members.

8. A transmission line as claimed in claim 2 wherein the pair of bracket members fit into slots on opposite sides of the gripping means, the slots of the gripping means guiding the bracket members from the holding means to the slot in the weight means.

9. A transmission line having apparatus for damping galloping comprising:
   gripping means, having an axis along the transmission line, engaged with a circumference of the transmission line; and
   weight means mounted to the gripping means with its center of gravity at a point spaced from the axis of the gripping means and mounted such that the transmission line is twisted by the downward force imposed by the weight means, the transmission line being substantially twisted in a manner which enables during galloping of the transmission line a continuous pattern of change in profile of an air foil formed by the transmission line to dampen the transmission line,
   said weight means being mounted to the gripping means by means which allow adjusting of the space location of the center of gravity of the weight means with respect to the axis of the gripping means during the mounting of the gripping means to the line.

10. A transmission line as claimed in claim 9 wherein said means allowing for adjusting of the space location of the center of gravity of the weight means includes a bolt through one end of the weight means and the gripping means, the weight means pivoting about the bolt in space relationship with the axis of the gripping means, the bolt tightening the weight means in position and the gripping means about the line.

11. A method of damping galloping in a transmission line, comprising the step of adding a component of twist to the transmission line using a weight on the line, which component is released when galloping movement causes the weight to approach a minimum gravity point, and reinduced between minimum gravity points, the releasing and reinducing of the component of twist continuously changing a profile of an air foil formed by the transmission line and thereby damping galloping of the transmission line,
   the step of adding a component of twist using a weight including adjusting a space location of the center of gravity of the weight with respect to the line such that the added component of twist is about 90 degrees to about 160 degrees.

12. Apparatus for damping movement in a line comprising:
   gripping means having an axis for extending along a transmission line engageable with a circumference of the line;
   weight means having its center of gravity located at a point spaced from the axis of the gripping means; and
   means for clamping the gripping means to the line, said means for clamping comprising
   a pair of bracket members fitting about opposite sides of the gripping means and extending into a slot through the center of the weight means; and
   means for holding together one end of the bracket members and the gripping means, the opposite ends of the bracket members being outwardly angled such that a combined width is greater than the width of the slot, but individual widths of the opposite ends of each bracket member being smaller than the width of the slot, the holding means being adapted for securing the gripping means about the line and holding the bracket members together within the slot to support the weight means.

13. Apparatus as claimed in claim 12 wherein said holding means includes a single bolt at the one end of the bracket members which causes the bracket members and the gripping means to pivot about the line such that the opposite ends of the bracket members exert an outward force within the slot of the weight means and thereby firmly retain the weight means.

14. Apparatus as claimed in claim 13 wherein the bracket members are shaped having central regions which are juxtaposed within the slot of the weight means, end regions of the one end which are spread apart about the gripping means and lie in planes parallel to the central regions, the end regions connected to one end of the central regions by inwardly angled pieces, and the outwardly angled opposite ends connected to opposite ends of the central regions.

15. Apparatus as claimed in claim 12 wherein said holding means includes a bolt positioned between said gripping mens and weight means such that the opposite ends of the bracket members loosely retain the weight means.

16. Apparatus as claimed in claim 15 wherein the bracket members are shaped having central regions which are juxtaposed within the slot of the weight means, end regions of the one end which are spread apart about the gripping means and lie parallel to the central regions, the end regions connected to one end of the central regions by inwardly angled pieces, and the outwardly angled opposite ends connected to opposite ends of the central regions, the loosely retained weight means rattling about the inwardly angled pieces and the outwardly angled opposite ends.

17. Apparatus as claimed in claim 15 wherein the ends of the slot through the center of the weight means have edges which are curved to associate with the bracket members.

18. Apparatus as claimed in claim 12 wherein said bracket members fit into slots on opposite sides of the gripping means.

19. A line having apparatus for damping vibration comprising:
   gripping means having an axis along the line engaged with a circumference of the line;
   weight means located at a point spaced from the axis of the gripping means and able to rattle about an axis of the weight means; and clamping means clamping the gripping means to the line with the center of gravity of the weight means located at a point from the axis of the gripping means above the line such that the axis of the weight means is at an angle with a vertical plane of movement of the line.

20. A line as claimed in claim 19 wherein the angle of the weight means to the vertical plane of movement of the line is greater than about 45 degrees.

21. A line as claimed in claim 19 wherein the clamping means comprise:

a pair of bracket members fitting about opposite sides of the gripping means and extending into a slot through the center of the weight means; and means for securing one end of each of the bracket members to the gripping means, opposite ends of the bracket members being outwardly angled to form a combined width greater than the width of the slot in the weight means with which to support the weight means but having individual widths less than the width of the slot, the securing means tightening the gripping means about the line and holding the bracket members together within the slot of the weight means to support the weight means.

22. A line as claimed in claim 21 wherein said means for securing include a bolt which is positioned between said gripping means and weight means such that the opposite ends of the bracket members loosely retain the weight means allowing the weight means to move in opposition to vibration movement of the line which is axial to the weight means.

23. A line as claimed in claim 22 wherein the bracket members are shaped having central regions which are juxtaposed within the slot of the weight means, end regions of the one end which are spread apart about the gripping means and lie parallel to the central regions, the end regions connected to one end of the central regions by inwardly angled pieces, and the outwardly angled opposite ends connected to opposite ends of the central regions, the loosely retained weight means rattling about the inwardly angled pieces and the outwardly angled opposite ends.

24. A transmission line as claimed in claim 22 wherein the ends of the slot through the center of the weight means have edges which are curved to associate with the bracket members.

25. A line as claimed in claim 21 wherein the bracket members are shaped having central regions juxtaposed within the slot of the weight means, end regions of the one end which are spread apart about the gripping means and lie in planes parallel to the central regions, the end regions connected to one end of the central regions by inwardly angled pieces, and the outwardly angled opposite ends of the bracket members connected to opposite ends of the central regions.

26. A line as claimed in claim 21 wherein said bracket members fit through slots on opposite sides of the gripping means.

27. A line as claimed in claim 21 wherein the ends of the slot through the center of the weight means have edges which are curved to associate with the bracket members.

28. A line as claimed in claim 19 wherein the gripping means engages the line about 6 to about 25 feet away from an end of a span of the line.

29. A method of reducing vibration in a line comprising the steps:

adding a first weight to the line at a first point in the line near a secured end of the line;

adding a second weight to the line opposing the first weight at a second point near the first point;

adding a third weight to the line at a third point at an opposite secured end of the line; and adding a fourth weight to the line at a fourth point near the third point opposing the third weight, the steps of adding each weight including attaching each weight to the line such that the weight is able to rattle about an axis of the weight.

30. A method as claimed in claim 29 wherein the first and second points at which opposing first and second weights are added to the line are about 6 to about 25 feet away from the pinned end of the line and about one foot apart from each other; and the third and fourth points at which opposing third and fourth weights are added to the line are about 6 to about 25 feet away from the opposite pinned end of the line and about one foot apart from each other.

31. A method as claimed in claim 29 wherein the steps of adding opposing weights includes forming an angle of about 90 degrees between said respective opposing weights.

32. Apparatus for damping movement in a line comprising:

gripping means having an axis for extending along a transmission line engageable with a circumference of the line;

weight means having its center of gravity located at a point spaced from the axis of the gripping means; and means for adjusting the space location of the center of gravity with respect to the axis of the gripping means during mounting of the gripping means to the line, the means for adjusting comprising fastener means through one end of the weight means and the gripping means, mounting the two together, the weight means pivoting about the fastener means in space relationship with the axis of the gripping means when the fastener means is loose, and the weight means secured in position and the gripping means tightened about the line when the fastener means is tightened.

33. Apparatus as claimed in claim 32 wherein said fastener means include a bolt and a star washer.

34. Apparatus as claimed in claim 32 further comprising a pair of bracket members about opposite sides of the gripping means, the weight means mounted to a side of one bracket member opposite the gripping means, the fastener means holding the bracket member, weight means and gripping means together.

35. A transmission line having apparatus for damping galloping comprising:

gripping means, having a axis along the transmission line, engaged with a circumference of the transmission line; and weight means mounted to the gripping means with its center of gravity at a point spaced from the axis of the gripping means and mounted such that the transmission line is twisted by the downward force imposed by the weight means, the weight means being mounted to the gripping means by clamping means comprising:

a pair of bracket members fitting adjacent to opposite sides of the gripping means and extending into a slot through the center of the weight means; and means to hold the gripping means and the bracket members together at one end of each of the bracket members, opposite ends of the bracket members being outwardly angled such that a combined width of the opposite ends is greater than the width of the slot, but individual widths of the opposite ends of each bracket member being smaller than the width of the slot, the opposite ends of the bracket members supporting the weight means.

36. A transmission line as claimed in claim 35 wherein the means to hold the gripping means and the bracket members together includes a bolt at the one end of each of the bracket members which causes the bracket members and the gripping means to pivot about the transmission line such that the opposite ends of the bracket members exert an outward force within the slot of the weight means and thereby firmly retain the weight means.

37. A transmission line as claimed in claim 36 wherein the bracket members are shaped having central regions which are juxtaposed within the slot of the weight means, end regions of the one end which are spread apart about the gripping means and lie parallel to the central regions, the end regions connected to one end of the central regions by inwardly angled pieces, and the outwardly angled opposite ends connected to opposite ends of the central regions.

38. A transmission line as claimed in claim 35 wherein said holding means is a bolt positioned between said gripping means and weight means such that the opposite ends of the bracket members loosely retain the weight means.

39. A transmission line as claimed in claim 38 wherein the bracket members are shaped having central regions which are juxtaposed within the slot of the weight means, end regions of the one end which are spread apart about the gripping means and lie parallel to the central regions, the end regions connected to one end of the central regions by inwardly angled pieces, and the outwardly angled opposite ends connected to opposite ends of the central regions, the loosely retained weight means rattling about the inwardly angled pieces and the outwardly angled opposite ends.

40. A transmission line as claimed in claim 38 wherein the ends of the slot through the center of the weight means have edges which are curved to associate with the bracket members.

41. A transmission line as claimed in claim 35 wherein the pair of bracket members fit into slots on opposite sides of the gripping means, the slots of the gripping means guiding the bracket members from the holding means to the slot in the weight means.

42. A transmission line having apparatus for damping galloping comprising:
gripping means, having an axis along the transmission line, engaged with a circumference of the transmission line; and
weight means mounted to the gripping means with its center of gravity at a point spaced from the axis of the gripping means and mounted such that the transmission line is twisted by the downward force imposed by the weight means,
said weight means being mounted to the gripping means by means which allow adjusting of the space location of the center of gravity of the weight means with respect to the axis of the gripping means during the mounting of the gripping means to the line.

43. A transmission line as claimed in claim 42 wherein said means allowing for adjusting of the space location of the center of gravity of the weight means includes a bolt through one end of the weight means and the gripping means, the weight means pivoting about the bolt in space relationship with the axis of the gripping means, the bolt tightening the weight means in position and the gripping means about the line.

44. A line having apparatus for damping vibration comprising:
gripping means having an axis along the line engaged with a circumference of the line;
weight means located at a point spaced from the axis of the gripping means; and
clamping means clamping the gripping means to the line with the center of gravity of the weight means located at a point from the axis of the gripping means above the line such that an axis of the weight means is at an angle with a vertical plane of movement of the line, the clamping means comprising:
a pair of bracket members fitting about opposite sides of the gripping means and extending into a slot through the center of the weight means; and
means for securing one end of each of the bracket members to the gripping means, opposite ends of the bracket members being outwardly angled to form a combined width greater than the width of the slot in the weight means with which to support the weight means but having individual widths less than the width of the slot, the securing means tightening the gripping means about the line and holding the bracket members together within the slot of the weight means to support the weight means.

45. A line as claimed in claim 44 wherein said means for securing include a bolt which is positioned between said gripping means and weight means such that the opposite ends of the bracket members loosely retain the weight means allowing the weight means to move in opposition to vibration movement of the line which is axial to the weight means.

46. A line as claimed in claim 45 wherein the bracket members are shaped having central regions which are juxtaposed within the slot of the weight means, end regions of the one end which are spread apart about the gripping means and lie parallel to the central regions, the end regions connected to one end of the central regions by inwardly angled pieces, and the outwardly angled opposite ends connected to opposite ends of the central regions, the loosely retained weight means rattling about the inwardly angled pieces and the outwardly angled opposite ends.

47. A line as claimed in claim 45 wherein the ends of the slot through the center of the weight means have edges which are curved to associate with the bracket members.

48. A line as claimed in claim 44 wherein the bracket members are shaped having central regions juxtaposed within the slot of the weight means, end regions of the one end which are spread apart about the gripping means and lie in planes parallel to the central regions, the end regions connected to one end of the central regions by inwardly angled pieces, and the outwardly angled opposite ends of the bracket members connected to opposite ends of the central regions.

49. A line as claimed in claim 44 wherein said bracket members fit through slots on opposite sides of the gripping means.

50. A line having apparatus for damping vibration comprising:
gripping means having an axis along the line engaged with a circumference of the line;
weight means located at a point spaced from the axis of the gripping means; and
clamping means clamping the gripping means to the line with the center of gravity of the weight means located at a point from the axis of the gripping means above the line such that an axis of the weight means is at an angle with a vertical plane of movement of the line, and said weight means rattles about the axis of the weight means.

* * * * *